United States Patent
Gillis et al.

[11] Patent Number: 5,827,424
[45] Date of Patent: Oct. 27, 1998

[54] CONTAMINANT REDUCTION SYSTEM FOR DISK DRIVES

[75] Inventors: Donald R. Gillis, San Jose; Andrew Marian Homola, Morgan Hill; David H. Jen; Erhard T. Schreck, both of San Jose, all of Calif.

[73] Assignee: International Business Machines Corporation, Armonk, N.Y.

[21] Appl. No.: 721,400

[22] Filed: Sep. 26, 1996

[51] Int. Cl.$^6$ .............................. F25B 21/02; B01O 35/18
[52] U.S. Cl. ........................... 210/180; 210/184; 55/523; 55/525; 62/3.2; 62/3.4; 95/52; 96/4
[58] Field of Search .................................. 62/3.2, 3.4, 92; 264/44; 75/407; 95/52; 96/4, 11; 55/523, 525; 210/766, 750, 175, 180, 184

[56] References Cited

U.S. PATENT DOCUMENTS

| | | | |
|---|---|---|---|
| 4,405,961 | 9/1983 | Chow et al. | 360/129 |
| 4,499,736 | 2/1985 | Lieu et al. | |
| 4,586,342 | 5/1986 | Morishita et al. | |
| 4,730,458 | 3/1988 | Alger. | |
| 5,045,111 | 9/1991 | Sane et al. | 75/407 |
| 5,382,396 | 1/1995 | Lee et al. | 264/44 |
| 5,414,591 | 5/1995 | Kimura et al. | 361/695 |
| 5,456,740 | 10/1995 | Snow et al. | 96/11 |

FOREIGN PATENT DOCUMENTS

| | | |
|---|---|---|
| 63-175202 (A) | 7/1988 | Japan. |
| 3-237675 (A) | 10/1991 | Japan. |
| 3-295298 (A) | 12/1991 | Japan. |
| 4-69887 (A) | 3/1992 | Japan. |
| 6-12856 (A) | 1/1994 | Japan. |

*Primary Examiner*—David A. Reifsnyder
*Attorney, Agent, or Firm*—Monica D. Lee; Charles D. Gunter; Andrew J. Dillon

[57] ABSTRACT

A contaminant reduction system is shown for a disk drive assembly having a closed interior and slider disk components located therein which would be adversely affected by condensed volatiles generated within the assembly. A Peltier element is located within the closed interior of the disk drive assembly so as to condense volatiles present within the interior at a desired condensation point within the closed interior. A getter material, such as a microporous sintered alumina, is located within the closed interior of the disk drive assembly at the condensation point for permanently trapping and maintaining condensed volatiles which are condensed by the Peltier element.

7 Claims, 1 Drawing Sheet

CONTAMINANT REDUCTION SYSTEM FOR DISK DRIVES

BACKGROUND OF THE INVENTION

1. Technical Field:

The present invention relates to contaminant reduction systems for entrapping condensed contaminants within an enclosure of an electronic device such as a disk drive assembly in which a disk head is disposed.

2. Description of the Related Art:

Many types of electronic devices feature a housing with a closed interior having at least one critical component located within the interior which would be adversely affected by condensed volatiles generated within the closed environment. For example, a typical disk drive in a computer assembly is housed in a box or cabinet which contains the head-disk assembly, one or more power supplies, electronic circuit boards, or like components making up the drive assembly. The head-disk assembly, in particular, is isolated within the closed interior in order to exclude airborne particles and like contaminants which might damage the magnetic media or other fragile surfaces. In use, modern disk drives often operate at higher temperatures than did the prior art drives. For example, a typical internal operating temperature might be on the order of 70° C. Thus a greater temperature differential exists between the ambient temperature surrounding the housing and the temperature of the internal components. A higher operating temperature leads to higher out-gassing of the various file components of the drive head and subsequently to a higher concentration of gaseous materials in the file environment. When a disk drive is deactivated and the air within the enclosure cools, water vapor and gaseous components of the type described tend to condense. Condensation of these materials at the head-to-disk interface within the disk drive can cause severe operational problems and limit the useful life of the disk drive.

One previously attempted solution to the problem of condensation within disk drives has been to use a chemical dehumidifier or desiccant within the enclosure. This expedient does not eliminate problems in all cases, however. In the typical installation, the desiccant canister which holds the desiccant must be changed at regular intervals and the desiccant itself can become entrained or otherwise carried by the circulating air within the closed interior, causing the desiccant to react with the media surfaces of the disk head to the detriment of the smoothness and integrity of the media surface.

Peltier type devices have also been used in the prior art in a variety of different applications within the electronics industry. The typical Peltier effect device has a thermocoupled junction and conductors for conducting current through the junction. The junction is housed in a module that has two opposing surfaces in heat communication with the respective sides of the junction so that, upon passage of current through the junction, there will be a temperature differential between the two opposing surfaces of the module. These devices have been employed in heating and/or cooling applications for electrical and other equipment. Typically, such Peltier elements dehumidify air by condensing water vapor within air flowing through a defined air passage and are dependent upon maintaining a controlled air flow for their effectiveness. Vapor drains have also been utilized in the prior art. These drains are filters that absorb specific substances. They can become contaminated quite easily, however, and lose their functionality.

A need exists, therefore, for a contaminant reduction system for an electronic device having a closed interior and at least one critical component located within the interior which is capable of effectively trapping and containing condensed volatiles present within the closed interior.

A need also exists for such a contaminant reduction system which is simple in design and economical to manufacture.

A need also exists for such a contaminant reduction system which is non-specific to the condensed contaminant being absorbed, thereby preventing contamination of the absorption substrate.

A need also exists for such a system which effectively traps undesirable condensed volatiles and which holds the trapped substances through capillary forces in a getter material in order to prevent the condensed volatiles from again evaporating.

SUMMARY OF THE INVENTION

The contaminant reduction system of the invention is intended for use with an electronic device having a housing with a closed interior and having at least one critical component located therein which would be adversely affected by condensed volatiles within the environment of the closed interior. The contaminant reduction system includes a thermoelectric heat transfer element located within the closed interior of the electronic device. The thermoelectric heat transfer element is selectively located for condensing volatiles present within the closed interior at a predetermined location within the closed interior. A getter material is located within the closed interior of the electronic device for permanently trapping and maintaining condensed volatiles which are condensed by the thermoelectric heat transfer element at the predetermined location within the closed interior of the electronic device.

Preferably, the contaminant reduction system is used with a disk drive assembly having a housing with a closed interior. A head-disk assembly is located within the closed assembly which would be adversely affected by condensed volatiles generated within the assembly. A Peltier element is located within the closed interior of the disk drive assembly for condensing volatiles present within the closed interior at a desired condensation point within the closed interior. The getter material is located within the closed interior of the disk drive assembly at the preferred condensation point for permanently trapping and maintaining condensed volatiles which are condensed by the Peltier element. The getter material is preferably a permanent getter material comprised of microporous metal. Most preferably, the permanent getter material is a sheet of microporous sintered metal such as sintered alumina having interconnected pores, wherein the pores of the microporous sintered alumina make up at least about 50% of the total volume of the getter material. The permanent getter material is non-specific to the condensed volatiles being trapped with the condensed volatiles being held by capillary forced within the pores of the microporous material.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
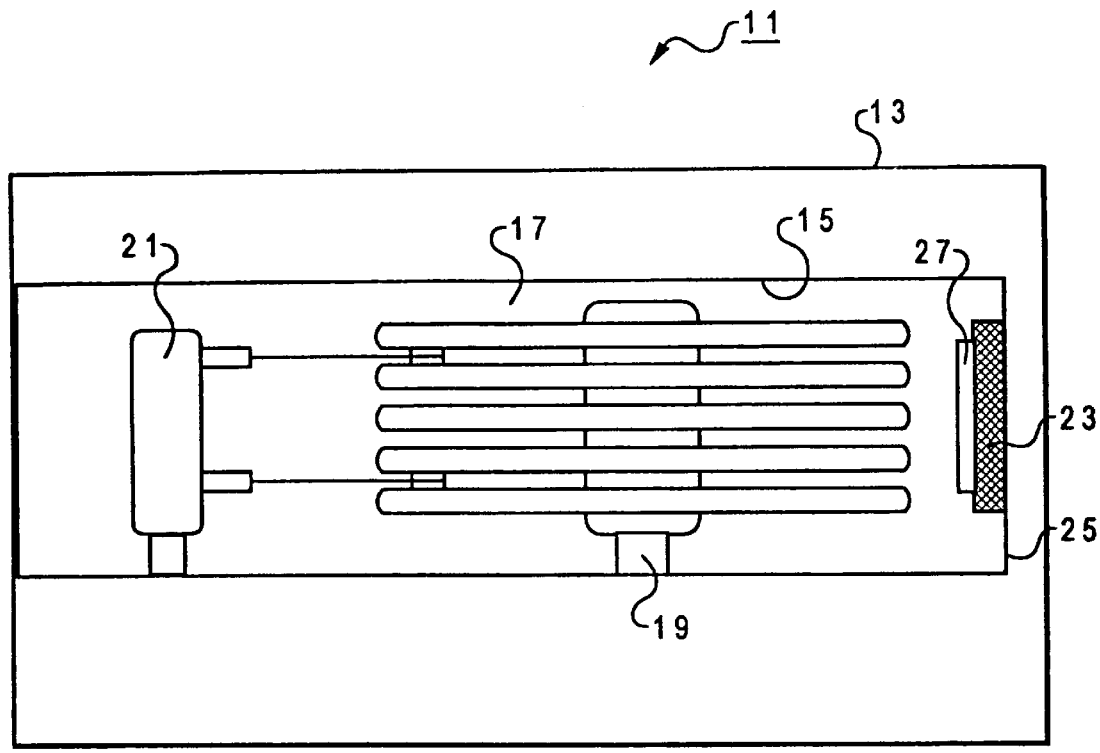
FIG. 1 is simplified, schematic view of a disk drive assembly featuring the contaminant reduction system of the invention.

Turning to FIG. 1, there is shown in simplified fashion an electronic device, in this case a disk drive assembly, designated generally as 11. The disk drive assembly 11 is comprised of a cabinet or housing 13 having a normally closed interior 15 and having at least one critical component located within the closed interior 15 which would be adversely affected by condensed volatiles within the closed environment. In the embodiment of the invention illustrated in FIG. 1, the disk drive assembly 11 includes a disk stack 17 mounted on a spindle 19, the stack being arranged for contact with the head-disk assembly, designated generally as 21. While the invention has been described with reference to the disk drive assembly 11, it will be appreciated by those skilled in the art that the contaminant reduction system could have application for any electronic device having a closed interior with critical components which would be adversely affected by condensed volatiles. For example, the principles of the present invention could be readily adapted to micromachining technology, high technology sensors, and similar fields.

As has been mentioned, newer disk drive assemblies operate at higher temperatures than did the prior art devices (typically about 70° C.). These higher operating temperatures lead to higher gaseous emissions of the various file components of the disk drive, thereby contributing to a higher concentration of gaseous materials in the closed interior of the disk drive housing. Condensation of such gaseous materials, among other areas at the head-to-disk interface, can cause severe functional problems within the system.

The present invention overcomes these and other problems present in the devices of the prior art by producing a preferable location at which condensation of the volatiles will occur. This solution leads to a drop of vapor pressure within the closed interior of the device housing at a particularly desirable location and reduces condensation at other critical locations within the assembly.

The present invention makes use of a thermoelectric heat transfer element (23 in FIG. 1), which in this case is a "Peltier" element, in combination with a "getter" material. The Peltier element 23 can be secured to the housing sidewall 25, as by a suitable adhesive, such as an epoxy adhesive, for example. The Peltier element has a hot junction on the side in contact with the housing wall 25 and has a cold junction which contacts a getter material 27. Electric current for activating the Peltier element 23 is obtained from a power supply through wire leads (not shown). The thermoelectric heat transfer element operates on the principle of thermoelectric (Peltier) cooling by actively transporting heat energy by means of current carriers. As has been briefly mentioned, Peltier effect devices have a thermocoupled junction and conductors for conducting current through the junction. The junction is housed in a module which has two opposing surfaces in heat communication with the respective sides of the junction so that, upon passage of current through the junction, there will be a temperature differential between the two opposing surfaces of the module. The flow of heat energy causes a net temperature gradient to appear so that the temperature at the cold junction is lowered and the temperature at the hot junction is increased. The thermoelectric cooling element has the advantage of having no moving parts and is relatively small in size. Peltier elements are widely available from a number of commercial sources. An example of a commercially available Peltier module that may be used to practice the present invention is the Melcor "Frigichip" miniature ceramic Module No. FC 0.6-66-06L.

As current is supplied to the Peltier module, the thermoelectric cooling element 23 effectively transfers heat energy from the getter material 27 to the housing wall 25. The housing wall thus serves as a heat sink and defuses the heat to the ambient environment by natural convection. In this way, heat is conducted away from the getter material 27 and a cold area is generated within the closed interior at a predetermined point where condensation is preferable. By selectively locating the Peltier element within the closed interior of the disk drive, one can actively and in a controlled manner (allowing for power optimization and cooling temperature needed), generate a cold area where condensation is preferable.

The Peltier element is preferably located in contact with a "getter" material within the closed interior of the disk drive. By properly selecting the "getter" material, the condensed volatiles will be trapped permanently in the material at a desired location and will not be released, even when the disk drive assembly is turned off or heated up in a nonpowered-up state through external heating.

The getter material used in the practice of the present invention can be any material which effectively and permanently traps condensed volatiles at a predetermined location within the closed interior of the electronic device without becoming filled or saturated. Preferably, the getter material is a microporous absorbant material, such as a microporous metal. Example metals include, for example, stainless steel, brass and alumina. One preferred getter material is a thin sheet of microporous sintered alumina.

Microporous sintered metals can be prepared in known manners. For example, microporous sintered metals can be prepared by first mixing together a quantity of bondable or sinterable ceramic powder, or mixtures of different ceramic powders which will either bond or sinter together with a polymer binder. A pore former is also typically mixed with the powder or powders and polymer binder. The pore former can be any suitable solid that can be removed by leaching, melting or pyrolysis. The pore former may include a lubricant or may have inherent self-lubricating properties. The polymer binder may be any thermosetting or thermoplastic resin that can be readily mixed with ceramic powder or powders and the pore former. The self-sustaining body is then consolidated to a shaped size, for example, by pressure compacting by die pressing. The shaped body is then elevated to sintering temperature to form a porous sintered ceramic body with cells and interconnecting pores therebetween. The sintered ceramic body has smooth walled cells formed by the pore formers and pores with rounded edges which interconnect the cells, the rounded edges forming transition points between the cells and pores.

The cell and pore characteristic may be controlled or affected by the deformability, size, distribution and location of the pore formers and the type, distribution and amount of lubricant used and also by the type of consolidation process used, the composition of the sinterable or bondable ceramic powder, or mixture of those ceramic powders and the type of polymer binder which is used. The ceramic powders, as sintered to form the ceramic body, should form a continuous, uninterrupted void free and dense sintered ceramic matrix interspersed between the interconnecting voids and pores.

It is possible, according to known techniques, to thus provide a ceramic body including a range of sizes and/or shapes of cells such that either the size range is uniformly repeated throughout the ceramic body from one section thereof to another or the cell sizes are randomly arranged and positioned throughout the body. The specification of the bondable or sinterable powder used as the starting material depends upon the application in which the ceramic body is to be used. However, alumina ($Al_2O_3$) may be used with appropriate sintering aids or binders such as, for example, calcium alumino borate glass. Also useful as a sintering aid for alumina are magnesium oxide and/or calcium oxide. A typical composition of a solid state phase sinterable ceramic powder is 99.8 weight percent $Al_2O_3$ with 0.2 weight percent MgO added. An example alumina is A16SG commercially available from The Aluminum Company of America (Alcoa). Other equivalent sources are also available commercially.

The shaped "green bodies" consisting of the polymer binder and the sinterable ceramic powder are typically fired in a furnace to both burn off the polymer binder and to sinter or bond the ceramic powder into a porous ceramic body. As the polymer binder burns off, the ceramic powder particles move toward each other densifying as the particles sinter to each other. Typically, the green body is placed in a furnace which can be controlled to vary the rate of increase in temperature per unit of time. When the sinterable ceramic powder is substantially alumina, the temperature of the furnace, for example beginning at about 150° C. is raised to about 600° C. at a rate of about 10° C. per hour to 30° C. per hour. This step effectively calcines the green body. No special atmosphere is needed as sintering of the alumina will occur in air. At the point where the green body reaches 600° C., any meltable pore former should have melted out or vaporized and most, if not all of the polymer binder has burned off. Further details of the preparation of such porous ceramic materials of the general type envisioned for use herein can be obtained in the literature, including U.S. Pat. No. 5,045,111, issued Sep. 3, 1991, to the Carborunbum Company and U.S. Pat. No. 5,137,634, issued Aug. 11, 1992, to Alcoa International Limited.

Figure 2:
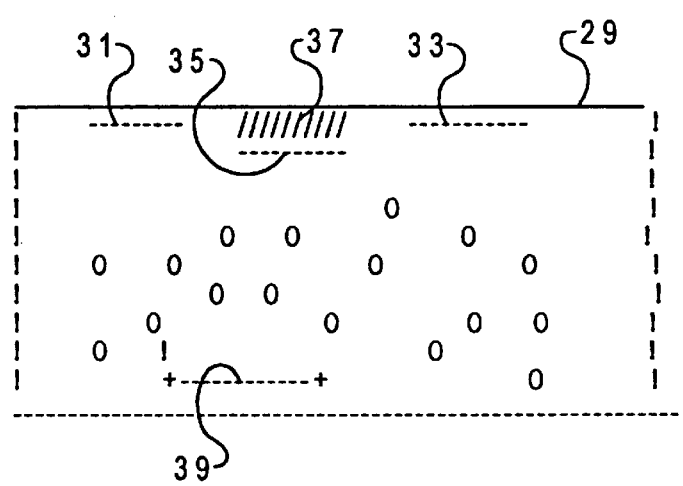
FIG. 2 is a simplified, schematic view of an experiment performed to illustrate the heat transfer effect achieved with the Peltier element which is used to condense undesirable volatiles present within the closed interior of the disk drive assembly of FIG. 1.

The operation of the combination Peltier element and permanent getter material of the invention can be further explained with reference to FIG. 2. In FIG. 2, an experiment was carried out in which a metal box 29 having dimensions of approximately 10×15×5 cm was provided having two silicon wafers 31, 33 in contact with the wall of the box, each of the wafers having a temperature T1. An additional silicon wafer 35 was mounted within the closed interior of the box on a Peltier element 37 having a temperature T2. At the bottom of the box 29, was placed a Squalane reservoir 39 into which several drops of Squalane were placed in order to saturate the box volume. The Squalane is a saturated hydrocarbon which is intended to simulate the production of gaseous volatiles within the closed interior of the disk drive system.

Experiment No. 1

Silicon wafer 35 was maintained at a 13 degree lower temperature than the remaining wafers 31, 33, through the use of the Peltier element 37.

T1=61 degrees
T2=48 degrees

After 15 hours, silicon wafers 31, 33 had adsorbed nothing and silicon wafer 35 had adsorbed 26 nm of Squalane. Assuming a measurement inaccuracy of 0.1 nm, silicon wafer 35 cooled by the Peltier element absorbed at least 260 times more condensed volatiles than did the warmer silicon wafers.

Experiment No. 2

The silicon wafer 35 was removed and the Peltier element was turned off. The temperature of the remaining silicon wafer 31, 33 was measured:
T1=61 degrees
T2=61 degrees After 15 hours, silicon wafers 31, 33 had adsorbed roughly 0.3 nm of Squalane.

The experiment showed that by providing one cool spot in the box volume, everything preferentially condenses on that area, thereby lowering the vapor pressure within the box closed interior. By appropriately lowering the vapor pressure within the closed interior, the saturated atmosphere is eliminated. The cold area behaves like a leak in the box interior where the vapor is actively extracted from the box. In other words, the cold area acts like a passage for the vapors to escape to the outside.

An invention has been provided with several advantages. The contaminant reduction system of the invention utilizes a combination Peltier element and permanent getter material to permanently trap undesirable gaseous volatiles which have been condensed within the normally closed interior of disk drive system. The getter material permanently traps the condensates even when the drive is turned off or heated up in a nonpowered-up state through external heating. There is no desiccant requiring periodic emptying of a desiccant canister. Because a vapor drain is not utilized, a filter is not present whose efficiency would depend critically upon the throughput of an airflow through the closed interior. Also, the permanent getter material is not specific to the substances been absorbed and therefore does not become contaminated or lose its functionality over the normal life of the device. Once the condensed volatiles are trapped within the getter material, they are held there by capillary forces within the pore structure of the getter material and cannot re-evaporate. Unlike current vapor drains which are known to be specific to certain organics and molecular weight materials, especially the lower weight organic (e.g. toluene), the getter material of the invention does not re-release such entrapped condensates with time. The invention could also be easily applied to other fields such as micromachining technology and high technology sensor environments.

While the invention has been particularly shown and described with reference to a preferred embodiment, it will be understood by those skilled in the art that various changes in form and detail may be made therein without departing from the spirit and scope of the invention.

What is claimed is:

1. A contaminant reduction system for an electronic device of the type having a housing with a closed interior and having at least one critical component located therein which would be adversely affected by condensed volatiles, the contaminant reduction system comprising:

a thermoelectric heat transfer element located within the closed interior of the electronic device, the thermoelectric heat transfer element being selectively located for condensing volatiles present within the closed interior at a location within the closed interior;

a getter material located within the closed interior of the electronic device for trapping and maintaining condensed volatiles which are condensed by the thermoelectric heat transfer element at the location within the closed interior of the electronic device; and wherein the getter material is a microporous sintered metal.

2. The contaminant reduction system of claim 1, wherein the getter material is mounted in contact with the thermoelectric heat transfer element located within the closed interior of the electronic device.

3. The contaminant reduction system of claim 1, wherein the getter material is microporous sintered alumina.

4. A contaminant reduction system for a disk drive assembly of the type having a housing with a closed interior and having a head-disk assembly located therein which would be adversely affected by condensed volatiles generated within the disk drive assembly, the contaminant reduction system comprising:

a Peltier element located within the closed interior of the disk drive assembly, the Peltier element being selectively located for condensing volatiles present within the closed interior at a desired condensation point within the closed interior;

a getter material located within the closed interior of the disk drive assembly in contact with the Peltier element at the desired condensation point for trapping and maintaining condensed volatiles which are condensed by the Peltier element, the getter material comprising a sheet of microporous metal.

5. The contaminant reduction system of claim 4, wherein the sheet of microporous metal is a sheet of microporous sintered alumina having interconnected pores, and wherein the pores of the microporous sintered alumina make up at least about 50% of the total volume of the microporous metal.

6. The contaminant reduction system of claim 4, wherein the getter material is non-specific to the condensed volatiles being trapped, the condensed volatiles being held by capillary forces within the pores of the microporous metal.

7. A contaminant reduction system for a disk drive assembly of the type having a housing with a closed interior and having a head-disk assembly located therein which would be adversely affected by condensed volatiles generated within the disk drive assembly, the contaminant reduction system comprising:

a Peltier element located within the closed interior of the disk drive assembly, the Peltier element being selectively located for condensing volatiles present within the closed interior at a desired condensation point within the closed interior;

a getter material located within the closed interior of the disk drive assembly in contact with the Peltier element at the desired condensation point for trapping and maintaining condensed volatiles which are condensed by the Peltier element, the getter material comprising a sheet of microporous material which is non-specific to the condensed volatiles being trapped, the condensed volatiles being held by capillary forces within the pores of the microporous material.

* * * * *